(12) United States Patent
Ando

(10) Patent No.: US 10,434,649 B2
(45) Date of Patent: Oct. 8, 2019

(54) WORKPIECE PICK UP SYSTEM

(71) Applicant: Fanuc Corporation, Yamanashi (JP)

(72) Inventor: Toshiyuki Ando, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 15/897,848

(22) Filed: Feb. 15, 2018

(65) Prior Publication Data

US 2018/0236664 A1 Aug. 23, 2018

(30) Foreign Application Priority Data

Feb. 21, 2017 (JP) ................. 2017-029853

(51) Int. Cl.
B25J 9/16 (2006.01)

(52) U.S. Cl.
CPC .......... B25J 9/1669 (2013.01); B25J 9/1697 (2013.01); G05B 2219/40053 (2013.01); Y10S 901/09 (2013.01); Y10S 901/40 (2013.01); Y10S 901/47 (2013.01)

(58) Field of Classification Search
CPC .......... B25J 9/1697; G05B 2219/40053; Y10S 901/47; Y10S 901/40; Y10S 901/09
See application file for complete search history.

(56) References Cited

U.S. PATENT DOCUMENTS

| 5,692,061 A * | 11/1997 | Sasada ............... G06K 9/00201 382/106 |
| 7,177,459 B1 | 2/2007 | Watanabe et al. |
| 2004/0122552 A1 | 6/2004 | Ban et al. |

(Continued)

FOREIGN PATENT DOCUMENTS

| CN | 101387880 A | 3/2009 |
| CN | 103112680 A | 5/2013 |

(Continued)

OTHER PUBLICATIONS

Japan Patent Office, Notification of Reasons for Refusal dated Sep. 4, 2018 for Japanese Patent Application No. 2017-029853.

(Continued)

Primary Examiner — Patrick H Mackey
(74) Attorney, Agent, or Firm — Winstead PC

(57) ABSTRACT

A workpiece pick up system including: a three-dimensional sensor which is placed at an upper side of a container and which obtains a group of three-dimensional points each of which has height position information in the container, a group creating means which creates a plurality of three-dimensional point groups in each of which adjacent points satisfy a predetermined condition, an exclusion group determining means which determines that one or more three-dimensional point groups which satisfy at least one of a predetermined size reference, a predetermined area reference, and a predetermined length reference are excluded groups, and a workpiece detecting means which obtains a group of detection-purpose three-dimensional points for detecting workpieces by excluding points included in the excluded group from the group of three-dimensional points or the plurality of three-dimensional point groups, and which detects the workpieces to be picked up by using the group of detection-purpose three-dimensional points.

3 Claims, 7 Drawing Sheets

(56) References Cited

U.S. PATENT DOCUMENTS

| | | |
|---|---|---|
| 2008/0082213 A1 | 4/2008 | Ban et al. |
| 2009/0033655 A1 | 2/2009 | Boca et al. |
| 2009/0069939 A1 | 3/2009 | Nagatsuka et al. |
| 2013/0238124 A1* | 9/2013 | Suzuki ............... B25J 9/16 700/250 |
| 2013/0238125 A1* | 9/2013 | Suzuki ............ B25J 9/1612 700/253 |
| 2013/0238128 A1* | 9/2013 | Suzuki ............ B25J 9/1669 700/258 |
| 2014/0067127 A1 | 3/2014 | Gotou |
| 2014/0067317 A1* | 3/2014 | Kobayashi ....... B25J 9/1697 702/153 |
| 2015/0124057 A1 | 5/2015 | Yamazaki |
| 2015/0127161 A1 | 5/2015 | Satou |
| 2015/0217451 A1* | 8/2015 | Harada ............ B25J 9/1612 700/253 |
| 2015/0276383 A1 | 10/2015 | Yoshikawa et al. |
| 2016/0229061 A1 | 8/2016 | Takizawa et al. |
| 2017/0341230 A1 | 11/2017 | Harada et al. |
| 2018/0253516 A1* | 9/2018 | Shimano ........... G06F 17/5009 |

FOREIGN PATENT DOCUMENTS

| | | |
|---|---|---|
| CN | 104816306 A | 8/2015 |
| CN | 105858188 A | 8/2016 |
| EP | 1043642 A2 | 10/2000 |
| EP | 1428634 A2 | 6/2004 |
| EP | 1043642 A3 | 8/2005 |
| EP | 1905548 A2 | 4/2008 |
| EP | 2036682 A2 | 3/2009 |
| JP | H04-30991 A | 2/1992 |
| JP | 2004-188562 A | 7/2004 |
| JP | 2008-87074 A | 4/2008 |
| JP | 2010-105081 A | 5/2010 |
| JP | 2013-215833 A | 10/2013 |
| JP | 2014-046371 A | 3/2014 |
| JP | 2015-085434 A | 5/2015 |
| JP | 2015-089590 A | 5/2015 |
| JP | 2015-089591 A | 5/2015 |
| JP | 2015-157343 A | 9/2015 |
| JP | 2015-197312 A | 11/2015 |
| JP | 2016-091053 A | 5/2016 |
| WO | WO-2005087452 A1 | 9/2005 |

OTHER PUBLICATIONS

Japan Patent Office, Search Report dated Aug. 28, 2018 for Japanese Application No. 2017-029853.
Japan Patent Office, Decision to Grant a Patent dated Nov. 13, 2018 for Japanese Patent Application No. 2017-029853.
State Intellectual Property Office of People's Republic of China, Office Action dated Mar. 4, 2019 for Application No. 201810146875.0.
The State Intellectual Property Office of the People'S Republic of China; Second Office Action for Chinese Application No. 201810146875.0; dated Jul. 18, 2019; 5 pages.

\* cited by examiner

WORKPIECE PICK UP SYSTEM

CROSS-REFERENCE TO RELATED APPLICATIONS

This application is based on and claims priority to Japanese Patent Application No. 2017-029853 filed on Feb. 21, 2017, the entire content of which is incorporated herein by reference.

TECHNICAL FIELD

The present invention relates to a workpiece pick up system which sequentially picks up a plurality of workpieces piled up in a container.

BACKGROUND ART

Conventionally, there is a workpiece pick-up device which captures an image of a plurality of workpieces piled up in a container by a sensor from an upper side to obtain three-dimensional information in which detected points respectively have height information, and determines that the highest portion of the three-dimensional information is a position where a workpiece to be picked up next is located, and picks up the workpiece which is located at the position by a robot. (See PTL 1, for example.)

CITATION LIST

Patent Literature

{PTL 1} Japanese Unexamined Patent Application, Publication No. H04-30991

SUMMARY OF INVENTION

A first aspect of the present invention is a workpiece pick up system which sequentially picks up a plurality of workpieces piled up in the container by a robot, which includes: a three-dimensional sensor which is placed at an upper side of the container and which obtains a group of three-dimensional points each of which has height position information as three-dimensional information of the workpieces in the container; and a controller, the controller is configured to conduct: a group creating process which creates a plurality of three-dimensional point groups in each of which adjacent points satisfy a predetermined condition; an exclusion group determining process which determines that one or more three-dimensional point groups which satisfy at least one of a predetermined size reference, a predetermined area reference, and a predetermined length reference are excluded groups; and a workpiece detection process which obtains a group of detection-purpose three-dimensional points for detecting workpieces by excluding points which are included in the one or more excluded groups from the group of three-dimensional points or the plurality of three-dimensional point groups, and which detects workpieces to be picked up by the robot by using the group of detection-purpose three-dimensional points.

DESCRIPTION OF EMBODIMENTS

A workpiece pick up system according to an embodiment of the present invention is described below with reference to the accompanying drawings.

Figure 1:
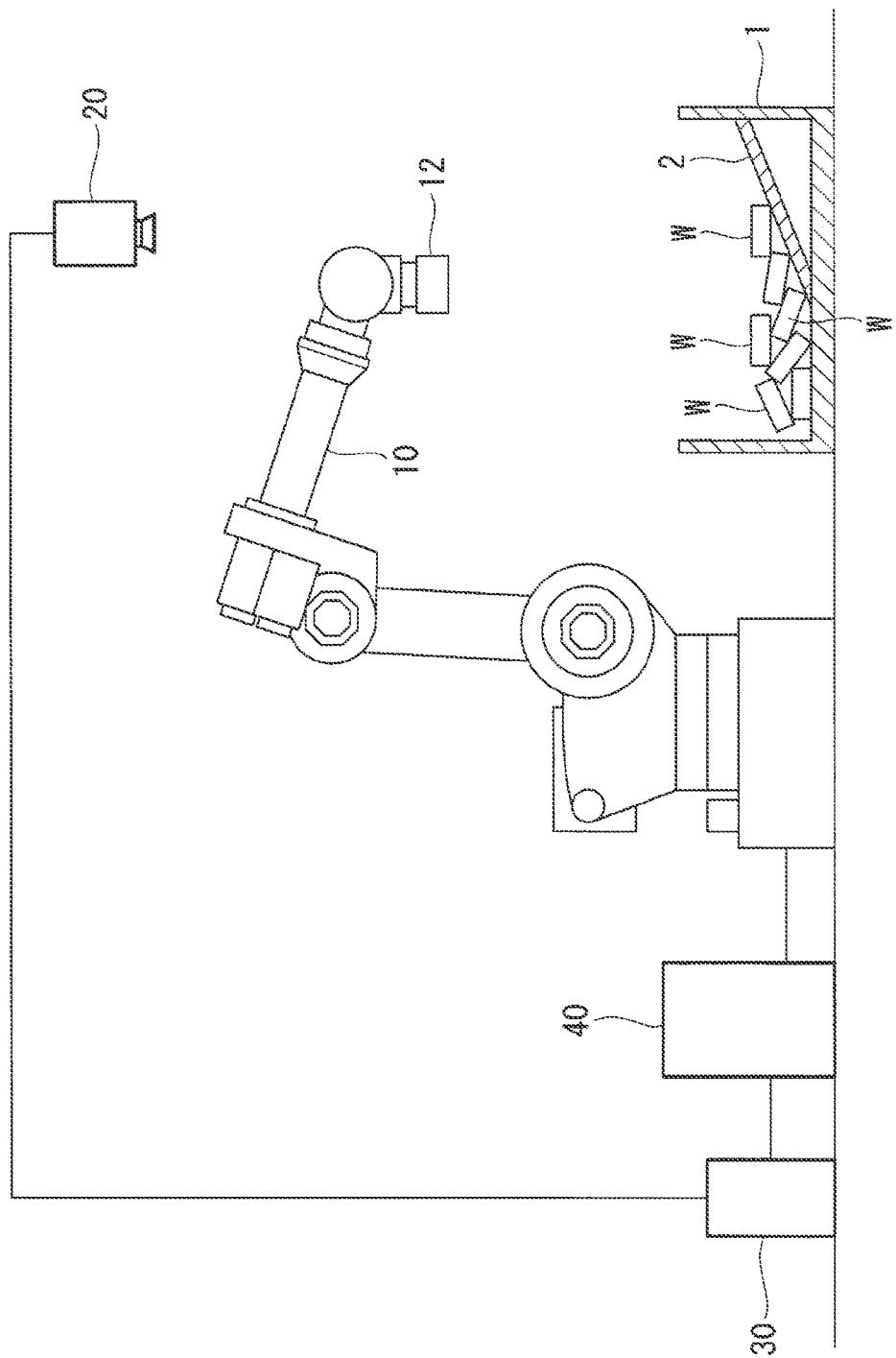
FIG. 1 is a schematic block diagram of a workpiece pick up system according to a first embodiment of the present invention.

As shown in FIG. 1, this workpiece pick up system sequentially picks up a plurality of workpieces W piled up in a container 1 by using a robot 10, and this workpiece pick up system includes a three-dimensional sensor 20 supported by a frame, which is not shown, at the upper side of the container 1, a workpiece position posture calculation apparatus 30 which is connected to the three-dimensional sensor 20, and a robot control unit 40 which is connected to the workpiece position posture calculation apparatus 30 and the robot 10.

Figure 2:
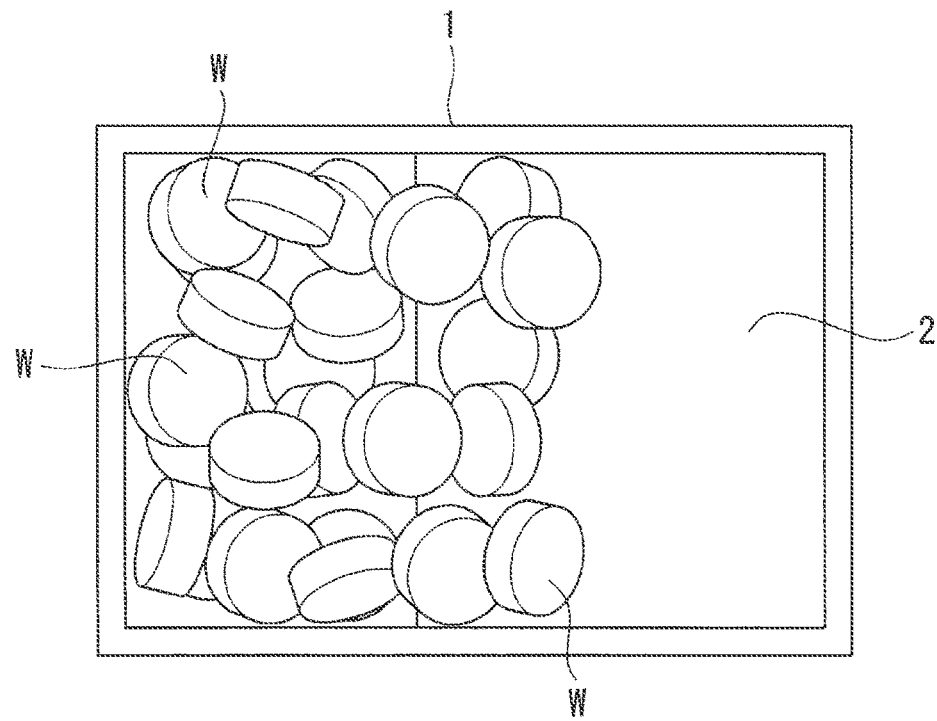
FIG. 2 is a partial plan view of a parts-handling container of the workpiece pick up system according to the embodiment.

As shown in FIGS. 1 and 2, an inclined surface 2 is provided on the bottom surface of the container 1 so that the workpieces W are moved toward a predetermined position in the container 1 by its weight. In this embodiment, the workpiece W has a disk shape, however, it may have other shapes.

The three-dimensional sensor 20 may be any sensor as long as it is capable of obtaining a group of three-dimensional points each of which has height position information as three-dimensional information of the workpiece W in the container 1.

As the three-dimensional sensor 20, various kinds of non-contacting type three-dimensional sensors can be used. For example, it could be a stereo type using two cameras, a type of scanning a laser slit light, a type of scanning a laser spot light, a type of projecting a pattern light on an object by using a device such as a projector and the like, a type of utilizing a travel time of light which is emitted from a projector and enters into a light receiver after reflected by a surface of an object, and the like.

Figure 3:
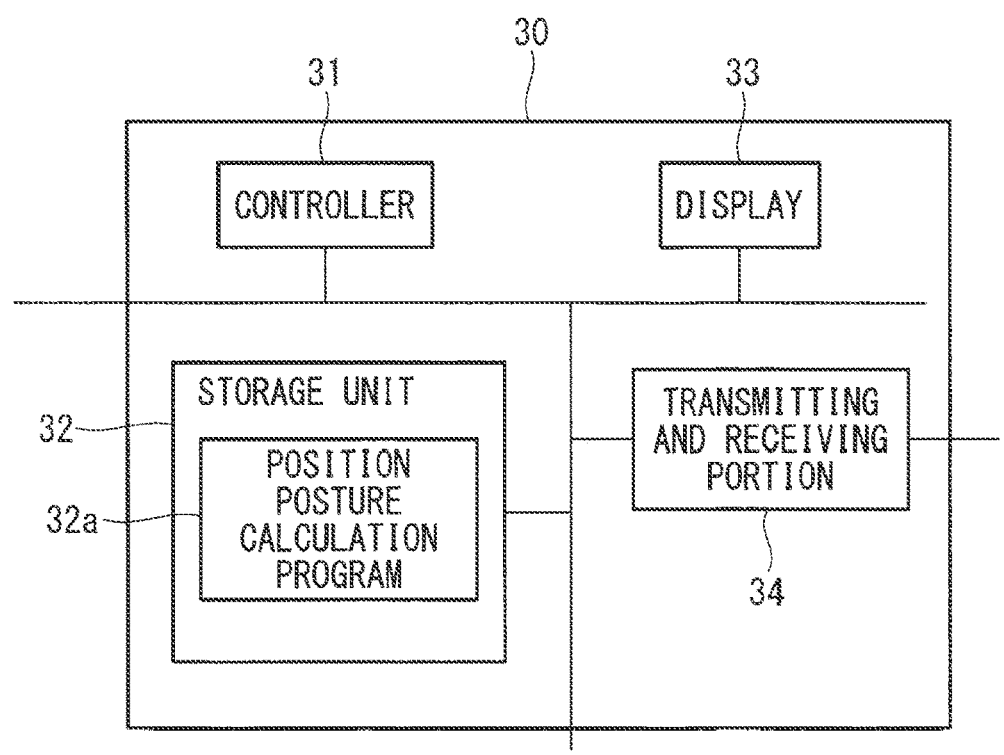
FIG. 3 is a block diagram of a workpiece position posture calculation apparatus of the workpiece pick up system according to the embodiment.

As shown in FIG. 3, the workpiece position posture calculation apparatus 30 includes a controller 31 having, for example, CPU, RAM, and the like, a storage device 32 having a non-volatile memory, ROM, and the like, a display 33, and a transmitting and receiving device 34. The storage device 32 stores a position posture calculation program 32a for calculating a position and/or posture of the workpiece W in the container 1.

The robot 10 has a plurality of movable parts, and it also has a plurality of servomotors 11 which respectively drives the plurality of movable parts, and a workpiece holding device 12 which is provided on a distal end of the robot 10, and the servomotors 11 and the workpiece holding device 12 are controlled by a robot control unit 40 which is described below (refer to FIG. 4).

As the servomotors 11, a servomotor such as a rotary motor, a linear motor, and the like can be used. In addition to the workpiece holding device which uses an electromagnet for attracting the workpiece W according to this embodiment, it is possible to use a known workpiece holding device which holds the workpiece W by means of claws, air suction, and the like.

Each of the servomotors 11 has a built-in operation position detection device such as an encoder for detecting its operation position, detected values of the operation position detection device are sent to the robot control unit 40, and the detected values are used for controlling the servomotors 11 by the robot control unit 40.

Figure 4:
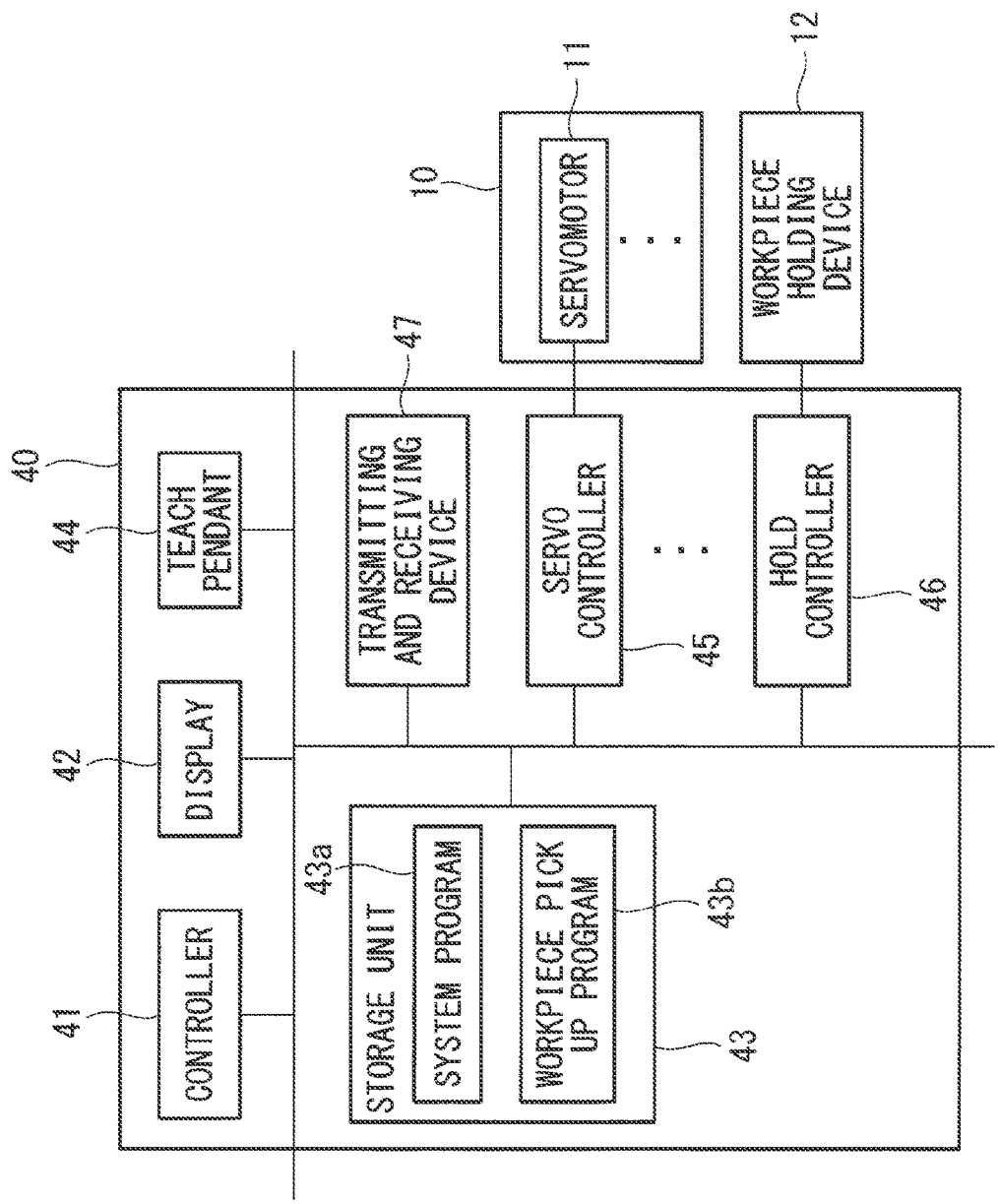
FIG. 4 is a block diagram of a robot control unit of the workpiece pick up system according to the embodiment.

As shown in FIG. 4, the robot control unit 40 includes a controller 41 having, for example, CPU, RAM, and the like, a display 42, a storage device 43 having a non-volatile memory, ROM, and the like, a teach pendant 44 which is operated for creating an operation program of the robot 10, and the like, a plurality of servo controllers 45 which are provided so as to correspond with the servomotors 11 of the robot 10 respectively, a hold controller 46 which controls the workpiece holding device 12, and a transmitting and receiving device 47.

A system program 43a is stored in the storage device 43, and the system program 43a provides a basic function of the robot control unit 40. Also, at least one workpiece pick up program 43b which is created by using the teach pendant 44, for example, is stored in the storage device 43.

For example, the controller 41 is operated by the system program 43a, reads the workpiece pick up program 43b which is stored in the storage device 43 so as to store it in RAM temporarily, and sends control signals to the servo controllers 45 and the hold controller 46 according to the read workpiece pick up program 43b, which controls servo amplifiers of the servomotors 11 so as to operate the robot 10, and by which attraction and non-attraction of the workpiece W by the workpiece holding device 12 are switched. Moreover, the controller 41 receives a result of workpiece detection, which is described later, from the workpiece position posture calculation apparatus 30, and controls the robot 10 and the workpiece holding device 12 so as to pick up the workpieces W located at positions corresponding to the detected results.

Figure 5:
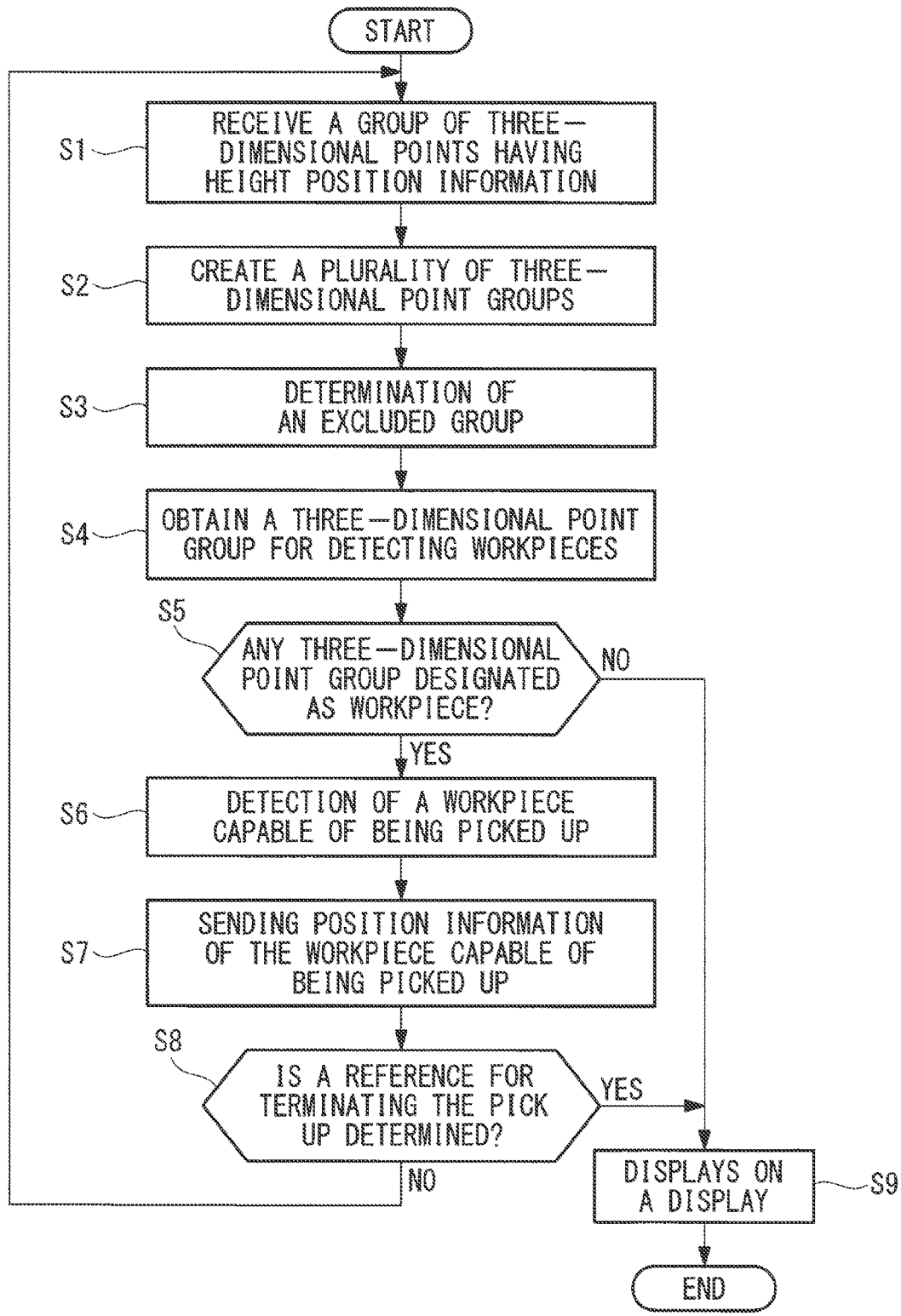
FIG. 5 is a flow chart illustrating an operation of a controller of the workpiece position posture calculation apparatus according to the embodiment.

An operational example of the controller 31 of the workpiece position posture calculation apparatus 30 of the above configured workpiece pick up system is described below with reference to FIG. 5. When conducting the operation, the controller 31 reads the position posture calculation program 32a to store it in RAM temporarily, and performs the below described process according to the position posture calculation program 32a.

The controller 31 receives a group of three-dimensional points from the there-dimensional sensor 20 (step S1).

Then, the controller 31 creates a plurality of three-dimensional point groups in each of which adjacent points satisfy a predetermined condition (step S2).

Figure 6:
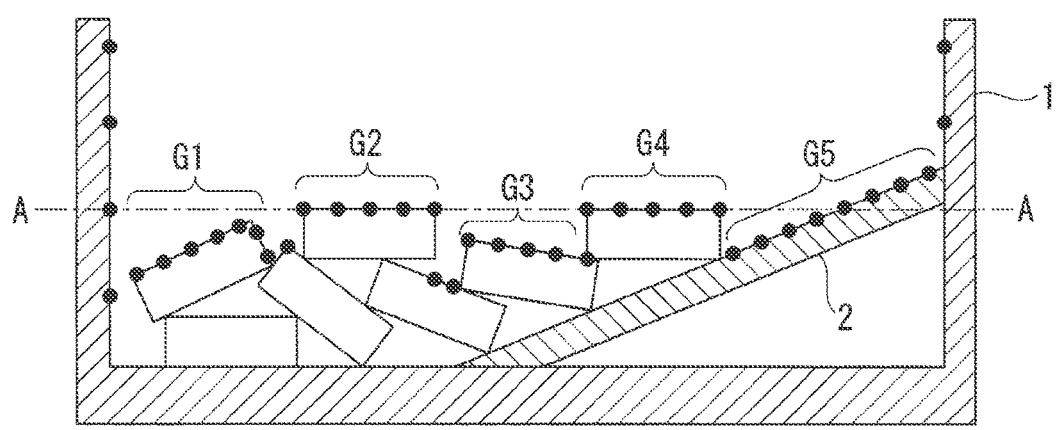
FIG. 6 is a diagram illustrating an example process of the workpiece position posture calculation apparatus according to the embodiment.

For example, when a condition that difference between the height positions of the adjacent three-dimensional points are less than ½ of the thickness of the workpiece W is used as a predetermined condition, three-dimensional point groups G1 to G5 are created in the case shown in FIG. 6. Also, the inclined surface 2 may have dents and protrusions because of collision of the workpieces W, therefore, such a configuration is preferable that the size of the dents and protrusions of the inclined surface satisfies the predetermined condition. Also, FIG. 6 is a two-dimensional schematic view, and only a small number of points are illustrated for easy understanding. In practice, such points are three-dimensionally distributed in the container 1.

In addition, as the predetermined condition, it may be possible to use a condition that the height positions of three or more adjacent three-dimensional points vary with a certain trend. For example, since height positions of four points on the left side of the three-dimensional point group G1 in FIG. 6 varies at a certain change rate, the four points are considered as a three-dimensional point group.

Next, among the plurality of three-dimensional point groups, the controller 31 determines that one or more three-dimensional point groups which satisfy at least one of a predetermined size reference, a predetermined area reference, and a predetermined length reference are excluded groups (step S3).

For example, when it is considered that the number of points aligned in the horizontal direction on the sheet of FIG. 6 corresponds with the length, and when using a reference that the three-dimensional point group having more than eight points in the length direction is determined to be the excluded group, only the three-dimensional point group G5 is determined as the excluded group. That is to say, the three-dimensional point group whose length is longer than the maximum length of the workpiece W, for example, the three-dimensional point group G5 located at a position corresponding to the inclined surface 2 of the container 1 is regarded as the excluded group. And, it is also possible to determine whether the three-dimensional point group should be excluded by calculating a length of the longitudinal direction of the obtained three-dimensional point group so as to compare the value with the maximum length of the workpiece.

Further, when it is regarded that the number of points of the three-dimensional point group corresponds to the area and the size since the points are three-dimensionally distributed in the thickness direction of the sheet in FIG. 6, it is also possible to use a reference that the three-dimensional point groups which have a predetermined number of points among the three-dimensional point groups are determined to be excluded groups.

Subsequently, the controller 31 obtains a group of three-dimensional points for detecting workpieces by excluding the points included in the excluded group from the group of three-dimensional points received in step S1 or the plurality of three-dimensional point groups created in step S2 (step S4). In FIG. 6, the points excluding the three-dimensional point group G5 (three-dimensional point groups G1~G4) are the group of three-dimensional points for detecting workpieces.

Then, the controller 31 determines whether there is a three-dimensional point group estimated as the workpiece W in the group of three-dimensional points for detecting workpieces obtained in step S4 (step S5), and when there is the three-dimensional point group estimated as the workpiece W, the process proceeds to step S6 which is described below, when there is no three-dimensional point group estimated as the workpiece W, the controller 31 determines that a reference for terminating the process of picking up the workpiece W is satisfied, and the process proceeds to step S9 which is described below.

Next, the controller 31 detects the three-dimensional point groups G2, G4 which correspond to points whose positions are higher than a predetermined height such as the height A of FIG. 6 among the points of the group of the three-dimensional points for detecting workpieces on the basis of the height information of each of the points received in step S1. The height position of A can be appropriately set based on the amount of the workpieces W in the container 1 (the maximum value, an average value of the height positions of the detected three-dimensional points), and the like.

Subsequently, the controller 31 sends information indicating at least positions of the workpieces, which are capable of being picked up, detected in step S6 to the robot control unit 40 (step S7), the information is, for example, three-dimensional position information of each of the workpieces capable of being picked up. The robot 10 picks up the workpieces capable of being picked up on the basis of this information.

Further, after all of the workpieces capable of being picked up have been picked up, the process starts again from step S1 except for a case where the size, the area, or the length of the excluded group satisfies a reference for terminating the pick-up for a reason that the number of the workpieces W is too small, or the like (step S8). On the other hand, when a detection instruction signal or the like cannot be received within a predetermined time period, and when the reference for terminating the pick-up is satisfied, such information is displayed in the display 33 (step S9), and the process is terminated.

Figure 7:
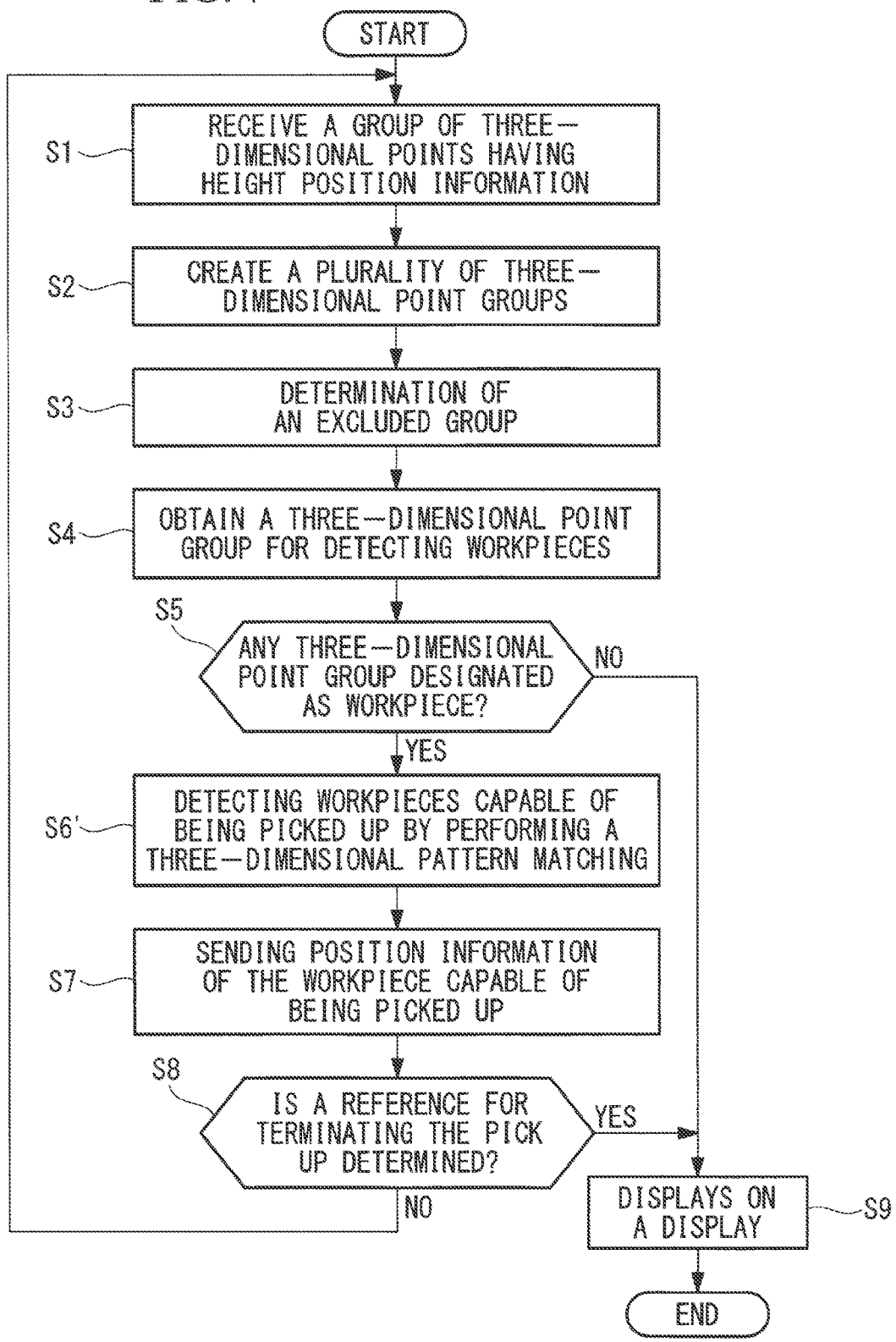
FIG. 7 is a flow chart illustrating an operation of a controller of a workpiece position posture calculation apparatus according to a modified example of the embodiment.

Also, in a case where the workpiece position posture calculation device 30 stores a three-dimensional shape data (CAD data and the like) of the workpiece W, which is the picked-up target, in the storage device 32, step S6' may be conducted instead of step S6, as shown in FIG. 7. In step S6', a position, posture, and the like of the workpiece W corresponding to each of the three-dimensional point groups G1 to G4 is determined through a three-dimensional pattern matching conducted by using the three-dimensional point groups G1 to G4 included in the group of three-dimensional points for detecting workpieces, and the three-dimensional shape data, and the workpieces W capable of being picked up are determined by using the determined result.

For example, a degree of inclination of the workpiece W corresponding to the three-dimensional point group G1 is estimated, and how much the workpiece W corresponding to the three-dimensional point group G3 overlaps with the workpiece W corresponding to the three-dimensional point group G4 is estimated, so as to detect workpieces W whose inclinations and overlaps are less than a reference inclination and a reference overlap as the workpiece capable of being picked up.

As described above, in accordance with this embodiment, the plurality of three-dimensional point groups G1 to G5, in each of which adjacent points respectively satisfy the predetermined reference, are created, and one or more three-dimensional point groups which satisfy at least one of the predetermined size reference, the predetermined area reference, or the predetermined length reference are determined as the excluded groups. Also, the group of three-dimensional points for detecting workpieces, which excludes the points included in the excluded groups, is determined, and the workpiece detection is conducted by using the group of three-dimensional points. Therefore, it prevents or reduces such a case that the robot 10 performs the pick-up operation of the workpiece W for many times at a position in the inclined surface 2 where there is no workpiece W, and it prevents or reduces such a case that the three-dimensional pattern matching is performed on the inclined surface 2.

Moreover, in the present embodiment, it is detected that the workpieces capable of being picked up exist at a position corresponding to the point higher than the predetermined height among the points on the basis of the height information of each of the points of the group of three-dimensional points for detecting workpieces. Accordingly, the workpieces W which are placed at the higher position piled up in the container 1 can be picked up sequentially, which enables performing efficient pick-up.

Moreover, when the robot control unit 40 is connected to the three-dimensional sensor 20, and the robot control unit 40 has the position posture calculation program 32a, it may be possible to configure that the robot control unit 40 performs the same function as this apparatus without having the workpiece position posture calculation apparatus 30.

Further, it is possible to configure that the three-dimensional sensor 20 is supported by the distal end of the robot 10, and in this case the same effect as described above can be achieved.

Figure 8:
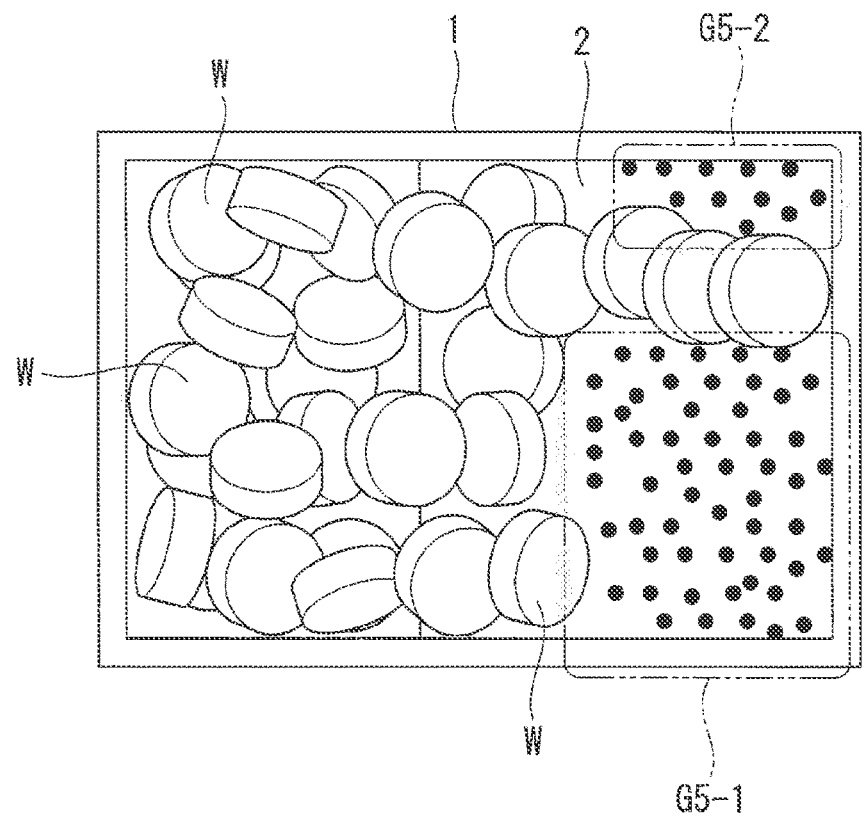
FIG. 8 is a diagram illustrating an operation of a controller of a workpiece position posture calculation apparatus according to another modified example of the embodiment.

In addition, in step S3, it is possible that a plane surface portion or a curved surface portion is estimated from a specific excluded group or a plurality of the excluded groups, and the three-dimensional points existing within a predetermined distance range from the estimated plane surface portion or the curved surface portion are included in the excluded group. For example, as shown in FIG. 8, the inclined surface 2 is divided by the workpiece W being left on a part of the inclined surface 2 in a plan view, by this, the three-dimensional point group G5-1 and the three-dimensional point group G5-2 are respectively created on the inclined surface 2. The three-dimensional point group G5-1 is determined as the excluded group satisfying the reference in step S3, however, the three-dimensional point group G5-2 might not be determined as the excluded group for a reason of not satisfying the reference in step S3. FIG. 8 only illustrates the three-dimensional points of a portion necessary for this explanation.

Figure 9:
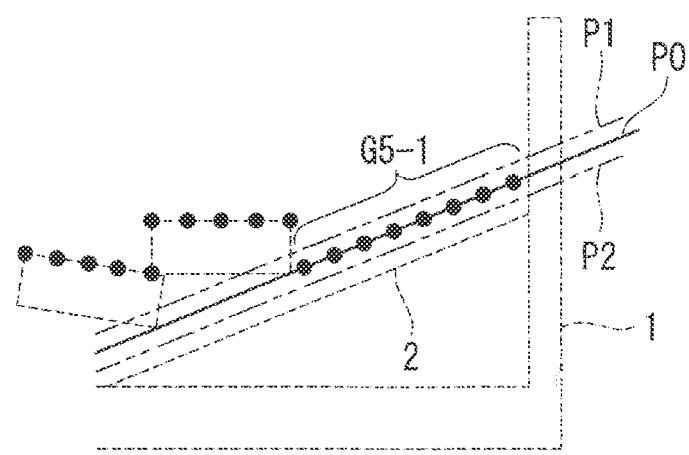
FIG. 9 is a diagram illustrating an operation of the controller of a modification example of the workpiece position posture calculation apparatus according to the present embodiment.

At this time, the three-dimensional point group G5-2 is included in the excluded group by estimating a plane surface (for example P0 in FIG. 9) based on the three-dimensional point group G5-1 which is the excluded group, and when the system is configured that three-dimensional point groups which are located within the predestined distance range (for example, between P1 to P2 in FIG. 9) in a direction perpendicular to the plan surface from the estimated surface are included in the excluded group, the three-dimensional point group G5-2 is included in the excluded group. By this, the inclined surface 2 is divided by the piled workpieces W in a plan view, and even when one of the divided portions is small, such area is not used for workpiece detection, which enables preventing or reducing a case where the three-dimensional points of the bottom surface of the container 1 are used for workpiece detection.

The inventor has arrived at the following aspects of the present invention.

A first aspect of the present invention is a workpiece pick up system which sequentially picks up a plurality of workpieces piled up in the container by a robot, which includes: a three-dimensional sensor which is placed at an upper side of the container and which obtains a group of three-dimensional points each of which has height position information as three-dimensional information of the workpieces in the container; a group creating means which creates a plurality of three-dimensional point groups in each of which adjacent points satisfy a predetermined condition; an exclusion group determining means which determines that one or more three-dimensional point groups which satisfy at least one of a predetermined size reference, a predetermined area reference, and a predetermined length reference are excluded groups; and a workpiece detection means which obtains a group of detection-purpose three-dimensional points for detecting workpieces by excluding points which are included in the one or more excluded groups from the group of three-dimensional points or the plurality of three-dimensional point groups, and which detects workpieces to be picked up by the robot by using the group of detection-purpose three-dimensional points.

With this aspect, the adjacent points create the plurality of three-dimensional point groups satisfying the predetermined condition. For example, when the plurality of three-dimensional point groups which satisfy a condition that a difference between height direction positions of the adjacent points is less than ½ of the thickness of the workpiece is created, the three-dimensional point groups are created so as to respectively correspond to the workpieces which can be seen from the above. Also, when an inclined surface or a curved surface is created at a bottom surface of the container, when the number of the workpieces in the container becomes small, and when the inclined surface or the curved surface can be seen from the above, a three-dimensional point groups which correspond to the inclined surface or the curved surface are created.

In addition, in this aspect, one or more three-dimensional point groups which satisfy at least one of the predetermined size reference, the predetermined area reference, and the predetermined length reference among the three-dimensional point groups are determined as the excluded groups. For example, when it is configured that a three-dimensional point group having a larger area than the maximum area of the workpiece, which is seen from above, satisfies the predetermined area reference, the three-dimensional point group which corresponds to the inclined surface or the curved surface is identified as the excluded group.

Also, in this aspect, the group of detection-purpose three-dimensional points which excludes the points included in the excluded group is obtained, and detection of the workpieces by using the obtained group of detection-purpose three-dimensional points is performed. Therefore, it is possible to prevent or reduce a case that the robot performs the workpiece pick-up operation for many times at a place where there is no workpiece, and which prevents or reduces a case that the three-dimensional pattern matching is conducted on the inclined surface or the curved surface.

With the above described aspect, the workpiece detection means may detect whether there is a workpiece capable of being picked up, on the basis of the height position information of each of the points of the group of detection-purpose three-dimensional point.

In this case, for example, the workpieces located at the upper side among the workpieces, which are piled up in the container, can sequentially be picked up, which enables performing the efficient pick-up.

With the above described aspect, the exclusion group detection means may estimate a plan surface or a curved surface in the container based on at least one of the determined excluded groups, and include three-dimensional points existing within a predetermined distance range from the estimated plan surface or the estimated curved surface in the determined excluded group.

In this case, even when the inclined surface or the curved surface of the bottom surface of the container is divided by the mounted workpieces for example, and even in a case where the divided portion is too small to satisfy the reference of the excluded group, it is possible to exclude the portion of the inclined surface or the curved surface which do not satisfy the reference of the excluded group to perform the workpiece detection.

According to the aforementioned aspects, it is possible to perform a pick up operation more efficiently.

REFERENCE SIGNS LIST 1 container
2 inclined surface
10 robot
12 workpiece holding device
20 three-dimensional sensor
30 workpiece position posture calculation apparatus
31 controller
40 robot control unit
41 controller
W workpiece

The invention claimed is:

1. A workpiece pick up system for sequentially picking up a plurality of workpieces piled up in a container by a robot, the workpiece pick up system comprising:
   a three-dimensional sensor which is placed at an upper side of the container and which obtains a group of three-dimensional points, each of which has height position information; and
   a controller, the controller being configured to conduct:
      a group creating process which determines in the group of three-dimensional points, a plurality of workpiece-candidate three-dimensional point groups each of which is composed with adjacent three or more of the three-dimensional points;
      an exclusion group determining process which determines that one or more workpiece-candidate three-dimensional point groups satisfy at least one of the following references:
         a reference of excluding workpiece-candidate three-dimensional point groups not within a predetermined size;
         a reference of excluding workpiece-candidate three-dimensional point groups not within a predetermined square measure; and
         a reference of excluding workpiece-candidate three-dimensional point groups not within a predetermined length; and
      a workpiece detection process which obtains a group of detection-purpose three-dimensional points for detecting workpieces by excluding points which are included in the one or more excluded groups from the group of three-dimensional points or the workpiece-candidate three-dimensional point groups, and which detects workpieces to be picked up by the robot by using the group of detection-purpose three-dimensional points.

2. The workpiece pick up system according to claim 1, wherein in the workpiece detection process, the controller detects whether there is a workpiece capable of being picked up, on the basis of the height position information of each of the points of the group of detection-purpose three-dimensional point.

3. The workpiece pick up system according to claim 1, wherein, in the exclusion group detection process, the controller estimates a plan surface or a curved surface in the container based on at least one of the determined excluded groups, and includes three-dimensional points existing within a predetermined distance range, in a direction perpendicular to the estimated plan surface or estimated curved surface, from the estimated plan surface or the estimated curved surface in the determined excluded group.

* * * * *